US009493307B2

(12) United States Patent
Hershfeld

(10) Patent No.: US 9,493,307 B2
(45) Date of Patent: Nov. 15, 2016

(54) CONVEYORS FOR BOX MAKING MACHINES

(71) Applicant: Robert Michael Hershfeld, Parkton, MD (US)

(72) Inventor: Robert Michael Hershfeld, Parkton, MD (US)

(73) Assignee: SUN AUTOMATION, INC., Sparks, MD (US)

( * ) Notice: Subject to any disclaimer, the term of this patent is extended or adjusted under 35 U.S.C. 154(b) by 0 days.

(21) Appl. No.: 13/999,578

(22) Filed: Mar. 11, 2014

(65) Prior Publication Data

US 2015/0259144 A1 Sep. 17, 2015

(51) Int. Cl.

*B41J 11/00* (2006.01)
*B65G 15/58* (2006.01)
*B65H 7/02* (2006.01)
*B65H 11/00* (2006.01)
*B31B 1/88* (2006.01)
*B41F 17/24* (2006.01)

(52) U.S. Cl.

CPC ................. *B65G 15/58* (2013.01); *B31B 1/88* (2013.01); *B41F 17/24* (2013.01); *B41J 11/007* (2013.01); *B41J 11/0085* (2013.01); *B65H 7/02* (2013.01); *B65H 11/005* (2013.01); *B31B 2201/0241* (2013.01); *B31B 2201/0247* (2013.01); *B31B 2201/88* (2013.01); *B65H 2406/362* (2013.01); *B65H 2406/42* (2013.01); *B65H 2511/10* (2013.01); *B65H 2511/22* (2013.01); *B65H 2511/31* (2013.01); *B65H 2511/514* (2013.01); *B65H 2513/10* (2013.01); *B65H 2513/514* (2013.01); *B65H 2701/1764* (2013.01)

(58) Field of Classification Search

CPC .................................................... B41J 11/0007
USPC ........................................................... 347/104
See application file for complete search history.

(56) References Cited

U.S. PATENT DOCUMENTS 5,012,932 A * 5/1991 Omura ............... G07D 11/0084 209/534
5,717,446 A * 2/1998 Teumer et al. ................. 347/35

(Continued)

FOREIGN PATENT DOCUMENTS

DE 2009 048 928 A1 4/2011
EP 1847 397 A2 10/2007

(Continued)

*Primary Examiner* — Julian Huffman
*Assistant Examiner* — Sharon A Polk
(74) *Attorney, Agent, or Firm* — William E. Mouzavires

(57) ABSTRACT

A vacuum belt conveyor sequentially delivers sheet articles to a digital printer. The sheets are held in position by vacuum on the underside of the sheets through apertures in the belts and covered by the sheets. A plurality of independent plenums on the underside of the belt have chambers respectively communicating with rows of apertures extending along the belt. Vacuum is selectively applied from a manifold only to the plenum chambers that supply apertures that are covered by the sheets so that the ink from the printer will not be directed from its intended position on the sheet by vacuum from adjacent uncovered belt apertures. The sheets are fed to the conveyor in synchronism with the conveyor speed by a timed feeder so that the sheets are carried by the conveyor with a predetermined gap between the sheets and no belt apertures in the gap. A sensor counts the apertures in the belt and activates the feeder at predetermined time intervals.

20 Claims, 9 Drawing Sheets

(56) References Cited

U.S. PATENT DOCUMENTS

| | | | | |
|---|---|---|---|---|
| 6,158,857 | A * | 12/2000 | Elgee | 347/104 |
| 6,216,848 | B1 * | 4/2001 | Zens | 198/689.1 |
| 6,336,722 | B1 * | 1/2002 | Wotton et al. | 347/102 |
| 7,635,124 | B2 * | 12/2009 | Sardella | B65H 3/042 271/10.06 |
| 2002/0109768 | A1 * | 8/2002 | Greive | B41J 11/0085 347/104 |
| 2007/0247505 | A1 * | 10/2007 | Isowa | B41J 3/407 347/101 |
| 2010/0276879 | A1 * | 11/2010 | Bober | B65H 5/224 271/276 |

FOREIGN PATENT DOCUMENTS

| | | | | | |
|---|---|---|---|---|---|
| IT | 0607761 | A1 * | 7/1994 | | B26D 3/16 |
| WO | 2011/133832 | A2 | 10/2011 | | |

* cited by examiner

CONVEYORS FOR BOX MAKING MACHINES

FIELD OF THE PRESENT INVENTION

The present invention generally relates to conveyors and methods of conveying articles such as sheets, and more particularly in a preferred form, to conveyors for box making machines where the articles are typically corrugated cardboard sheets called "boards" or "corrugated boards" or even "corrugated" alone.

BACKGROUND OF THE INVENTION

In the field of box-making, sheets, typically corrugated boards, are sequentially conveyed along a horizontal path to one or more stations along the path where operations like cleaning, printing, cutting, slotting or scoring are performed on the boards in a timed sequence. It is essential that the boards arrive at each of the aforementioned work stations in "registration", that is, in a predetermined timed sequence. Various examples of corrugated board conveyors including timed feeders may be found in U.S. Pat. Nos. 4,045,015; 4,494,745; 4,632,378; 4,681,311; 4,889,331; 5,184,811 and, 7,635,124 B2.

Several methods of conveying the boards to the various stations along the path are presently in use in the industry. One uses opposed pull rolls which pull the boards through the nip between the rolls. Another method uses rotatable friction rolls made, for example, with a urethane surface on which the boards are maintained by vacuum. This method which is disclosed in U.S. Pat. Nos. 7,096,529 B2, and 5,004,221, is sometimes referred to as "vacuum transfer".

Another vacuum transfer method employs a belt conveyor which supports the boards while they are held on the conveyor belt by vacuum. This type of conveyance is sometimes referred to as a "vacuum belt conveyor", and one example of such is disclosed in U.S. Pat. No. 5,163,891.

The above methods have been and still are satisfactory where the boards are printed by passage between opposed rolls or cylinders, one being an "impression" roll and the other, a "print" roll having a printing plate and ink to transfer the image of the plate to the board in well-known fashion. However when a digital printer is used instead of the above system, a problem may arise when the boards are conveyed to the printer by a vacuum belt conveyor. In one form of this system, a vacuum transfer unit is used and the conveyor belt is perforated to provide a plurality of holes or apertures that communicate the vacuum with the board to hold the board on the belt. If any of the belt apertures adjacent to the edges of the boards is not covered or closed by the board, ink is subject to deviation ("windage") from its intended position on the image being printed on the board. It is understood that the digital printer includes a print head having a plurality of ink discharge ports or nozzles from which the inks are deposited to form the image on the board. If the vacuum used to hold the boards on the conveyor belt is free to divert the flow of ink from the print head to the board to form the desired image, the resulting image will be adversely affected—smudged, distorted, off-color, etc. Such a result is of course not acceptable in the printing industry.

OBJECTS OF THE PRESENT INVENTION

One of the objects of the present invention is to provide novel methods and apparatus for digital printing of articles such as sheets or boards sequentially conveyed along a path, typically a horizontal path. Included herein is the provision of such methods and apparatus that are particularly useful in the digital printing of corrugated boards, for example, in a box-making machine.

A further object of the present invention is to provide a novel vacuum transfer conveyor for use in moving sheet-like articles along a path to be printed by a digital printer positioned at a station along the path. Included herein is such a conveyor that is particularly useful in a box-making machine.

Another object of the present invention is to provide a novel vacuum transfer conveyor for digital printing of sheets which are delivered to a digital printer by a conveyor belt but without adversely affecting the quality of the image printed on the sheets. Included herein is the provision of such a conveyor that will substantially reduce if not solve the problem identified above.

Another object of the present invention is to provide a novel and improved conveyor belt for use in a vacuum transfer conveyor for sequentially feeding sheets to a digital printer for printing on the sheets.

A further object of the present invention is to provide a novel vacuum control system for a vacuum conveyor for controlling the distribution or communication of vacuum to the conveyor belt for holding the sheets on the belt but without adversely affecting digital printing of the sheets at a station along the conveyor.

SUMMARY OF PREFERRED METHODS AND APPARATUS OF THE PRESENT INVENTION

A conveyor having a horizontal endless belt movable along a horizontal path to sequentially deliver sheets, for example corrugated boards, to a digital print station for printing a predetermined, desired image on the boards. The image can of course include numbers, letters, words, designs, shapes, characters, etc. of virtually any type. The printer includes a print head located typically above the conveyor path and including a plurality of ink discharge ports or nozzles for directing ink to the sheets to form the desired image. A vacuum is applied under the top run of the conveyor belt for communication with the sheets through holes or apertures in the belt. A vacuum control system is provided below a section of the belt at a location along the path below the print head so that the flow or communication of the vacuum with each belt aperture may be selectively closed or opened. The operator of the apparatus will open the vacuum (suction) to the apertures covered by the sheets to hold the sheets on the belt but will close the vacuum to the apertures that are not covered by the sheets and are close enough to the edges of the sheet and would otherwise communicate the vacuum with the ink discharged by the print head to possibly cause unwanted deviation of the ink on the sheet being printed.

In one preferred embodiment, the vacuum control system includes a plurality of independent plenums each having a vacuum chamber in communication with a vacuum manifold having a vacuum chamber communicating with a vacuum source such as a suitable blower. The plenums underlie the conveyor belt and are respectively in communication with the rows of apertures in the belt through, for example, conduits extending between the plenum and manifold chambers. A control member such as a piston-like diverter member is movable to selectively place vacuum in the manifold chamber in communication with one or more plenum chambers to apply vacuum only to the apertures in communication with those plenum chambers.

In one preferred system and method, the sheets are delivered on the conveyor belt offset to one side of the belt so that side of the sheets covers all of the adjacent or nearby apertures of the conveyor belt on that side of the conveyor belt. If the belt apertures on the opposite side of the belt are open (not covered by the sheets), the operator will, through the vacuum control system, block or close the vacuum suction to those apertures so that they cannot communicate the vacuum with the ink being discharged on the sheet by the nozzles to form the desired image. In addition, the vacuum conveyor is supplied with the sheets to be printed by a timed feeder such as, for example, described in U.S. Pat. No. 7,635,124 B2. This feeder times the delivery of the sheets on the vacuum conveyor which moves at a constant speed for a given job or operation, such that the gaps between successive sheets on the belt of the vacuum conveyor do not have any apertures thereby avoiding the possibility of the vacuum reaching through the belt at the sheet edges at the opposite ends of the sheet to deviate or draw the ink from its intended path during a printing operation. To this end the distance or "pitch" between the conveyor belt apertures measured in the direction of sheet travel along the conveyor path, is selected such that the length of the sheet (measured in the direction of sheet travel along the path) plus the gap dimension between successive sheets equals a multiple of the pitch of the belt apertures. Once the desired gap between the sheets is selected, the time cycle of the feeder (see U.S. Pat. No. 7,635,124 B2) may be easily adjusted to deposit each sheet on the belt conveyor at the same predetermined interval of time to form the desired gap between the sheets being conveyed by the vacuum conveyor to the digital printer. In one preferred embodiment, a photoelectric sensor is used to count the belt apertures as they pass the sensor for a given belt speed. Knowing the pitch of the apertures and the length of each sheet, the number of apertures that need to be covered by each sheet fed on the conveyor belt may be determined as well as the amount of the sheet that will extend beyond the forward most and rearward most apertures covered by the sheet.

DRAWINGS

Other objects and advantages of the present invention will become apparent from the following more detailed description of the present invention taken in conjunction with the accompanying drawings in which.

DETAILED DESCRIPTION

Figure 1:
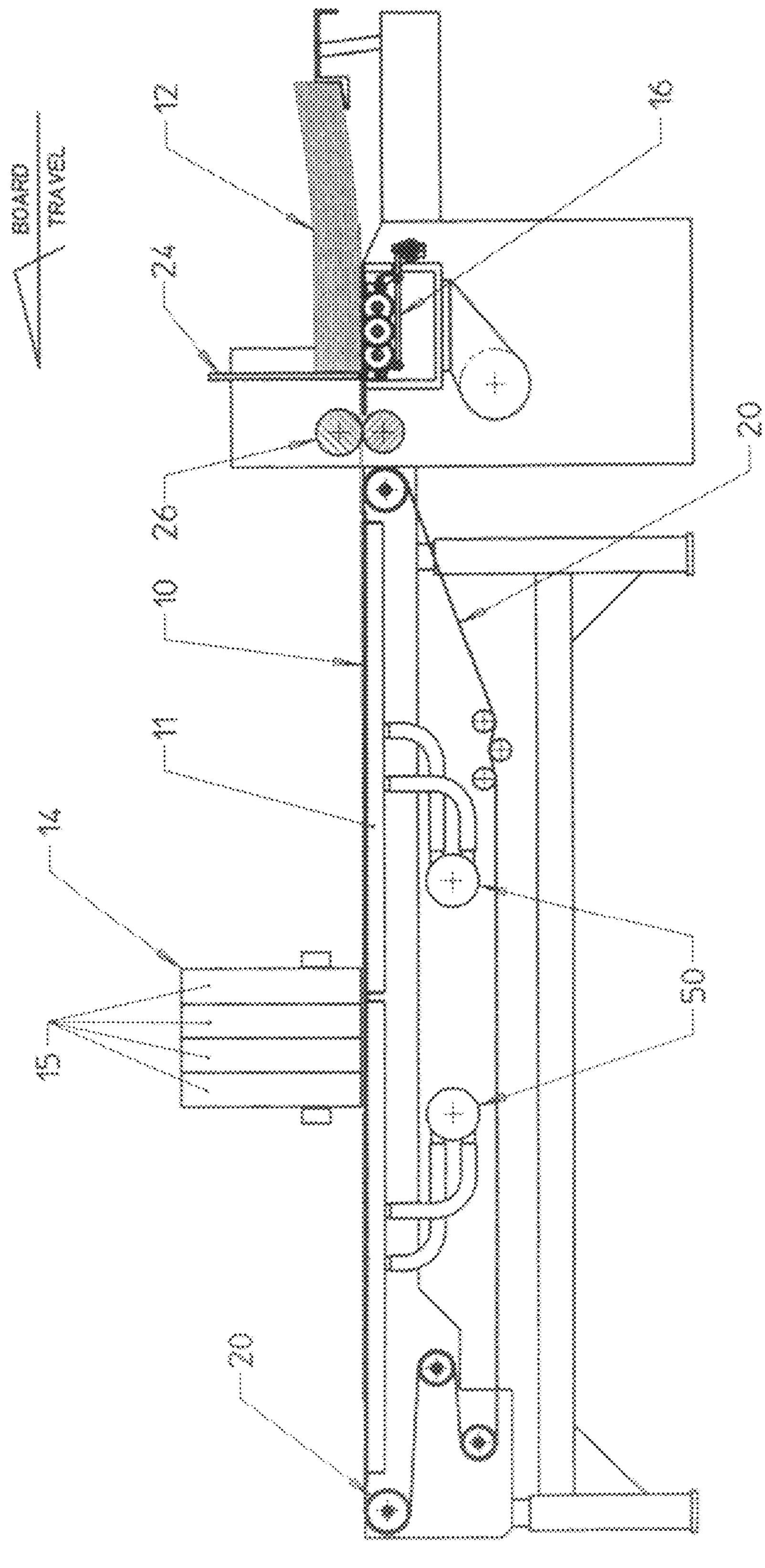
FIG. 1 is an elevational view of a box-making apparatus including a feeder and a belt conveyor for delivering corrugated boards to a digital printer for printing the boards.
Figure 2:
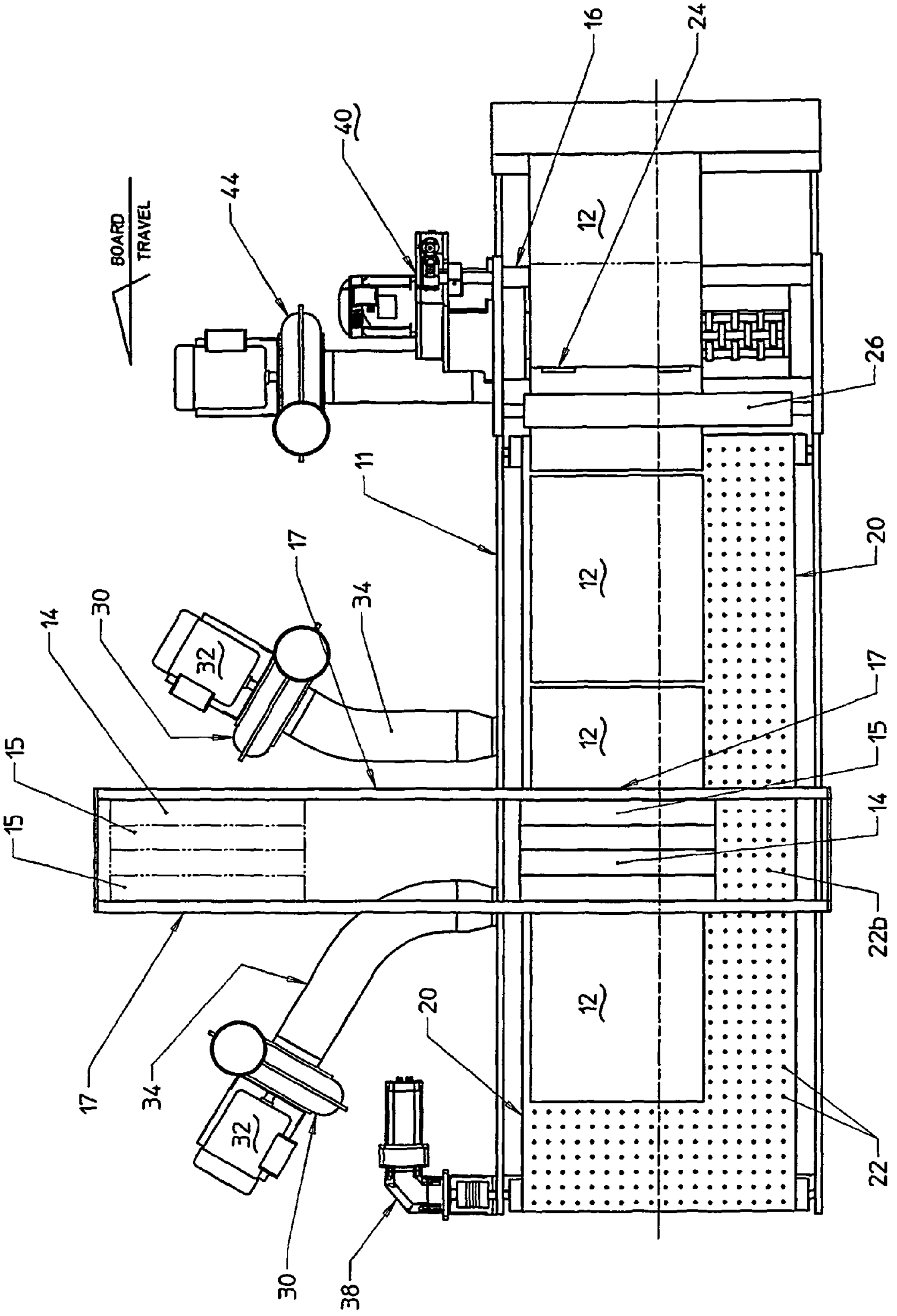
FIG. 2 is a plan view of the apparatus of FIG. 1.
Figures 3, 4, 5:
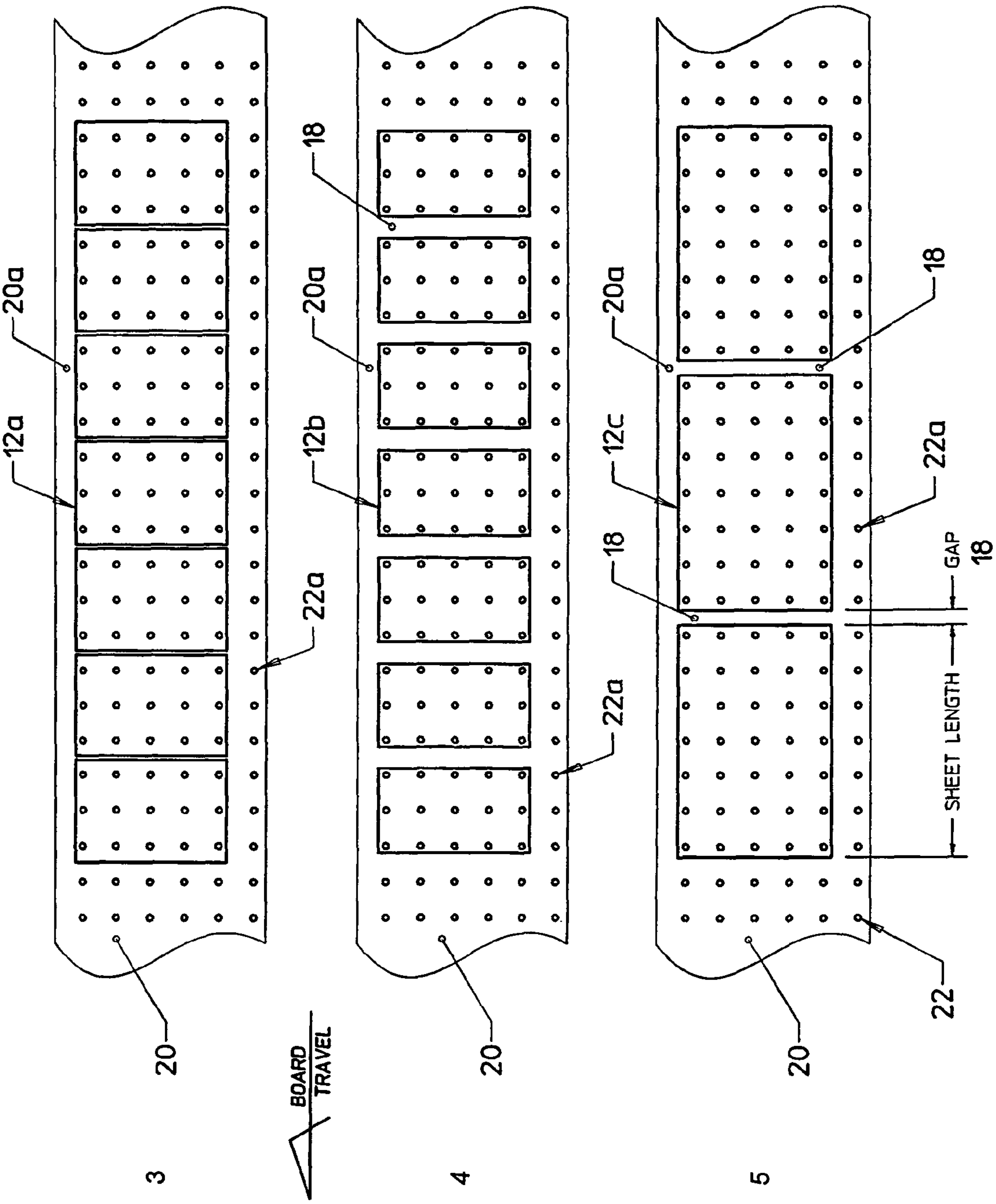
FIGS. 3 to 5 are plan views of sections of the conveyor belt with three different size boards being transported by the belt to the printer (not shown)

Referring to the drawings in detail and initially to FIGS. 1-5, there is shown for illustrative purposes only, one preferred embodiment of the present invention including a belt conveyor 10 for sequentially feeding sheets such as corrugated boards 12 one behind the other in horizontal planes along a horizontal path to a digital printer 14 for printing an image on the top surface of the boards 12 when they arrive below the printer 14. Also shown is a feeder 16 for feeding the boards 12 one by one in a predetermined timed fashion to conveyor 10 from a stack of boards. Feeder 16 is a timed feeder such as described in U.S. Pat. No. 7,635,124 B2 to Sardella whose disclosure is hereby incorporated by reference into the present application as part hereof. For a particular job, feeder 16 delivers a board 12 to conveyor 10 at a predetermined interval of time so that the boards 12 are transported to the printer 14 with the same predetermined space or gap 18 between successive boards, one gap being shown in FIG. 5. Conveyor 10 includes a perforated belt 20 with holes or apertures arranged in rows as shown in FIGS. 3, 4 and 5 which illustrate three different sizes of boards 12*a*, 12*b*, and 12*c* that may be processed for printing in accordance with the present invention.

Feeder 16 in the specific embodiment is a vacuum conveyor and may use a series of conveyor belts or driven rolls engageable with the underside of the boards to drive them under a gate 24 and to the nip of a pair of pull rolls 26 which in turn drive the boards on to the inlet end surface of conveyor belt 20. The latter is driven at a constant speed to sequentially deliver the boards to the printer 14. Boards 12 are positively held on the conveyor belt 20 by vacuum supplied by a vacuum control system to the underside of the boards 12 through the belt apertures 22. FIG. 2 shows the blowers 30 and their motors 32 which remove air from below the boards 12 on the conveyor belt 20 and through the belt apertures 22 and conduits 34 thereby producing a vacuum for positively holding the boards 12 on the conveyor belt as the latter transports them along the conveyor path. FIG. 2 also shows a motor 36 for driving the downstream end sprocket 38 of the conveyor 10 through any suitable transmission. In addition, FIG. 2 shows a servo motor and a transmission generally at numeral 40 for driving the feeder 16 in a timed fashion as will be further described below. In the embodiment of the feeder 16 which utilizes a vacuum to hold the boards 12 on the transport rolls or endless belts, a blower such as shown in FIG. 2 at 44 may be used to produce the vacuum under the boards 12. A more detailed description of feeder 16 including its transmission 40 is disclosed in above-identified U.S. Pat. No. 7,635,124 B2.

The Printer

Printer 14 is a commercially available ink jet printer including a plurality of print heads for four colors. For example, one printer could have twenty (20) print heads with five (5) heads per color. A larger printer for printing larger sheets could have forty-eight (48) print heads with twelve (12) heads per color. All of the heads for each color are assembled together into a print bar. Printer 14 of the shown embodiment has four (4) print bars 15 shown in FIGS. 1 and 2. The print heads of course have nozzles for discharging ink on the sheet to form the desired image, character or any desired indicia, etc. on the sheets. A print head could have as many as 2,656 nozzles. Also the nozzles can be spaced from the sheet being printed in a range of 1 to 4 mm. but when printing corrugated board a spacing of 3 mm. is preferred. In the specific embodiment shown, print bars 15 are mounted for movement in a holder 17 between an operative position shown in FIG. 2 for printing the sheets 12 and in inoperative position on the drive side of the conveyor 10 as shown in phantom lines in FIG. 2. The printer may be slid along holder 17 into any desired position over the sheet 12 in order to print the desired image at the desired location on the sheet 12. Various printer sizes can be used depending on the size of the sheet. A maximum sheet size for one machine could be for example 1000 mm. (width—across the machine) by 1600 mm. A minimum sheet width could be for example 250 mm. The print width equals the sum of the print width of all heads of a single color. For a five head system this amounts to a print width of about 23" (inches) and for a twelve head system a print width of about 53" (inches). One preferred method that may be used to practice the present invention uses a drop on demand ink jet print head which can print at speeds up to 200 meters per minute at 600×480 dpi. In addition to the print head described above, printer 14 includes pumps and a controller including a computer for controlling the print head and sending image data in accordance with a print program. The entire printer, also termed “print engine” in the art, is commercially available.

Vacuum Control System

Figure 6:
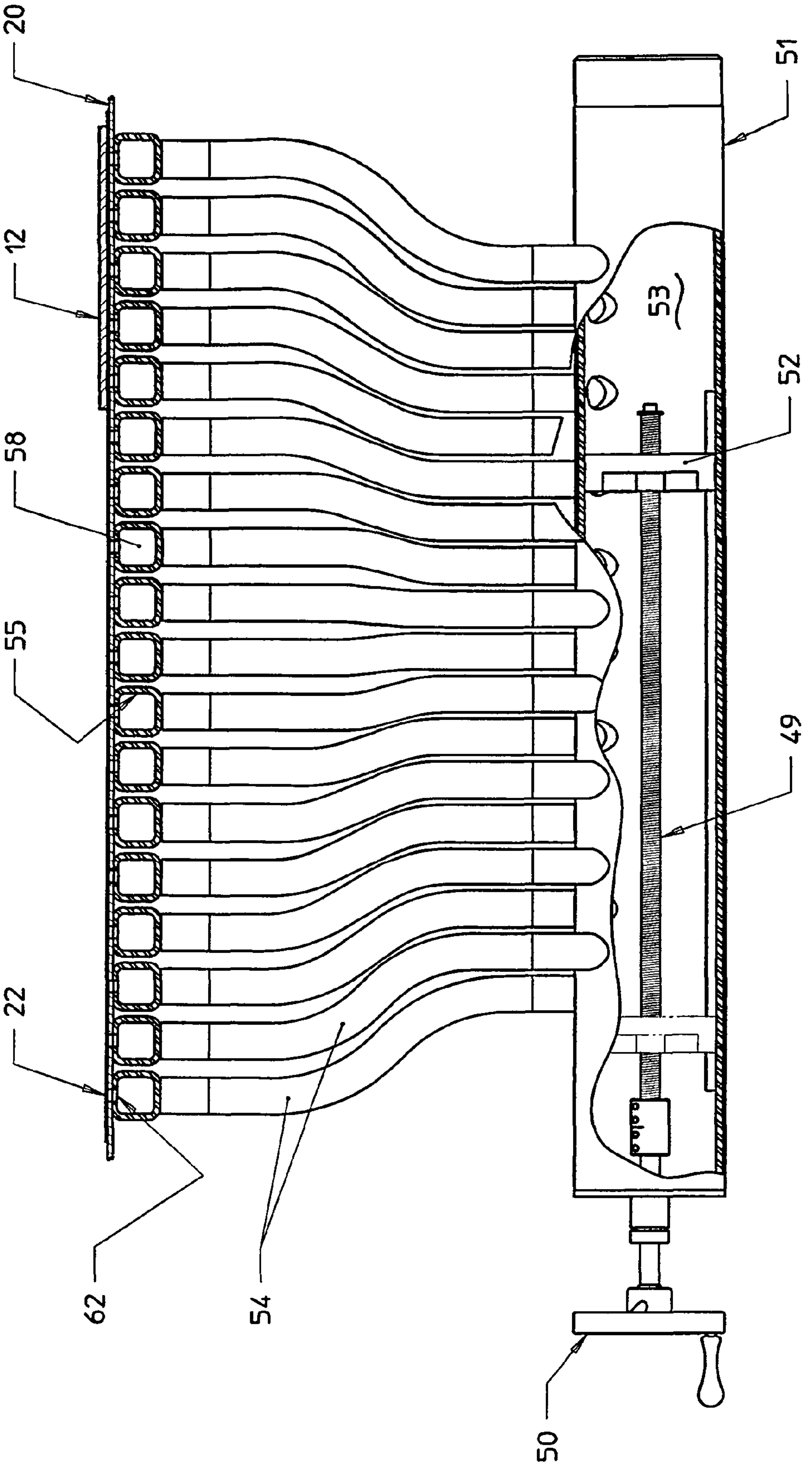
FIG. 6 is an enlarged cross-sectional view taken transversely of the belt conveyor.
Figure 7:
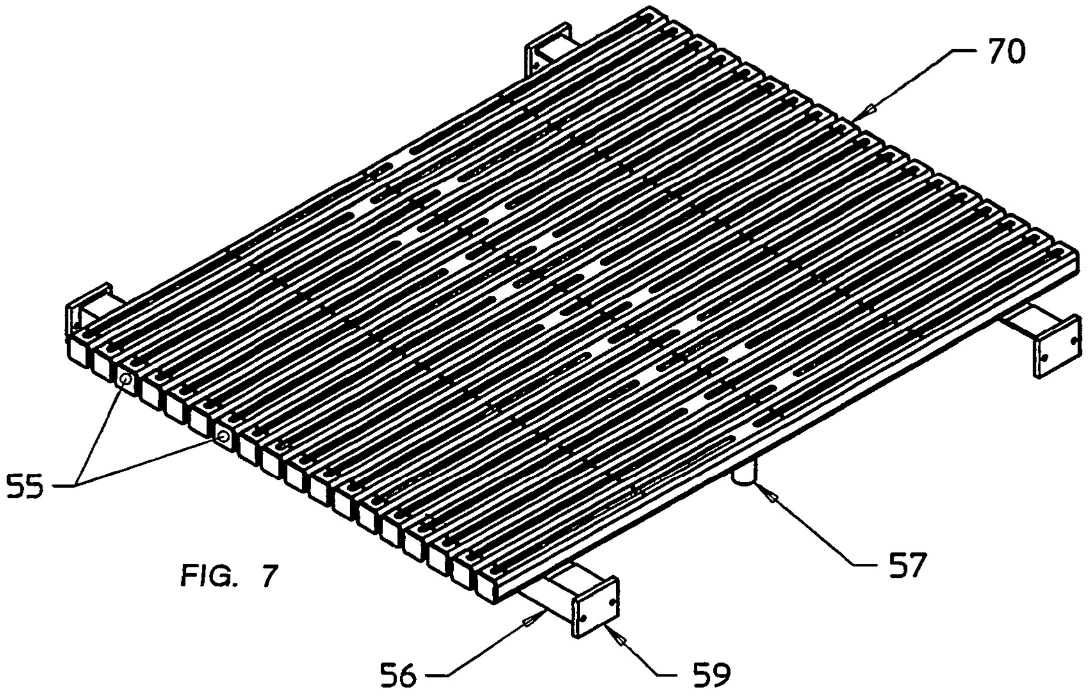
FIG. 7 is a plan view in perspective of a system of vacuum plenums underlying the top run of the belt conveyor for supporting the belt and supplying vacuum to the sheets through apertures in the belt.
Figure 8:
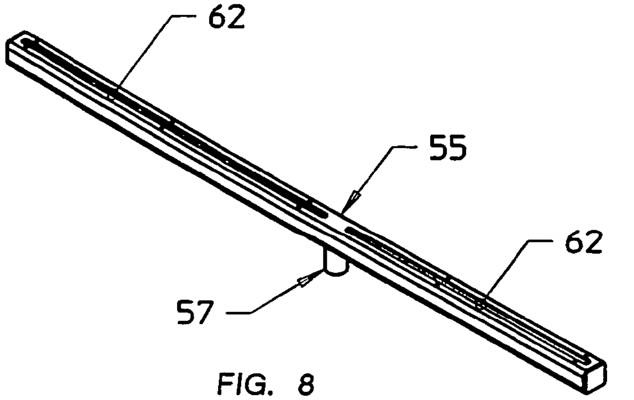
FIG. 8 is a perspective view of one of the plenums shown in FIG. 7 to an enlarged scale.

Referring to FIGS. 6-8, a vacuum control system is provided for controlling the vacuum applied to the apertures 22 of the conveyor belt 20 to hold the sheets in position on the conveyor belt 20. Vacuum blowers 30 respectively driven by motors 32 shown in FIG. 2 produce a vacuum or suction in conduits 34 (see FIG. 2) which communicate with a vacuum manifold 51 (see FIG. 6) through conduits such as hoses. Manifold 51 encloses a vacuum chamber 53 from which a plurality of conduits such as hoses 54 extend to communicate the manifold chamber 53 with a plurality of independent plenums 55 shown in FIGS. 7 and 8. In the preferred embodiment shown, plenums 55 provide the support surface of the upper run of the belt 20 of conveyor 11. Plenums 55 extend longitudinally along the conveyor path and are assembled to and fixed on, in side by side abutting relationship, underlying base pieces 56 which in turn are fixed through flanges 59 to opposite sides of the conveyor frame generally designated 11 at an upper portion thereof. Plenums 55 are each elongated and hollow to provide independent elongated vacuum chambers 58 which respectively communicate with the rows of belt apertures 22 extending along the path of conveyor belt 20. To that end, plenums 55 each have a slot 62 (see FIG. 6) in its top wall communicating with only one row of belt apertures 22. Therefore each row of belt apertures 22 extending along the conveyor path is in communication with plenum chamber 58. Plenums 55 may be molded or otherwise made from any suitable metallic material, and in the specific embodiment shown, include a depending pin 57 for locating the plenum in position in a top frame portion of conveyor 10. Although only one plenum assembly 70 is shown in FIG. 7 it will be understood that a plurality of plenum assemblies may be used in continuous fashion under the conveyor belt 20 throughout the entire length of the conveyor belt or throughout a length sufficient to accommodate and print any size of sheet without vacuum interference with the flow of ink at the edge areas of the sheet. Also in other forms of the invention, the plenums can be combined with the manifold in one unit or can be directly supplied with vacuum from other sources.

In order to block or close the vacuum at certain apertures for example apertures 22*b* in FIG. 2 or 22*a* in FIGS. 3-5, the operator rotates hand wheel 50 to rotate screw rod 49 to axially move diverter 52 along the manifold chamber 53 until vacuum in chamber 53 is blocked from the appropriate conduit 54 leading to the plenum chamber 58 which communicates with the row of apertures 22*b* or 22*a* whichever the case may be. It will be seen that one or more plenum chambers 53 may be blocked from vacuum in the manifold 51 by the same position of diverter 52 in the manifold chamber, it being understood that each plenum 55 communicates or is in registry with only one row of apertures 22 that extend in the longitudinal direction of conveyor belt 20.

Operation

Depending on the size of the boards 12 being processed, the timing of the deposit of the boards 12 on the conveyor 10 is selected such that the gap 18 (see FIG. 5) between successive boards 12 as they are being conveyed on the conveyor 10 will not overlie any of the belt apertures 22 so that the printing ink issuing from the printer 14 will not be distorted, diverted or deviate into the marginal areas of the boards at the edges adjacent the gaps 18. To that end the gap 18 is selected so that the length of the board (measured in the direction of the travel path) plus the size of the gap (measured in the direction of the travel path) will equal a multiple of the “pitch” of the belt apertures (where the pitch is the distance between adjacent apertures 22 measured in the direction of sheet travel. FIGS. 3-5 illustrate three different size boards 12*a*, 12*b* and 12*c* as they would appear on the conveyor belt 20. In each case, the gaps 18 between the boards do not overlie any of the belt apertures 22. Also it should be noted that the boards 12*a*, 12*b*, and 12*c* are offset or “justified” towards one side of the conveyor belt 20 so that there are no belt apertures 22 in the marginal areas 20*a* between the boards and the edges of the belt on that side. Preferably that side of the conveyor is the “drive side” where the motors and drive 40 of the feeder 16, vacuum blowers 32, 34 and drive 38 for conveyor 10 are located. The opposite side is termed the “operator side” where the operator controls and oversees the operation of the machine. Referring to FIG. 1, standing on the operator side, the operator closes the flow of vacuum to the apertures 22*a* by rotating the spindle 50 to move the diverter 52 to block the vacuum flow to apertures 22*a* so that the ink being deposited on the boards will not deviate or otherwise be diverted from its intended path in the formation of the desired printed image on the board. FIG. 2 shows a conveyor belt 20 having a different size than the belt in FIGS. 3-5. The belt 20 in FIG. 2 also has more apertures 22 than the belt shown in FIGS. 3-5. The operator will block off the vacuum to the apertures 22*b* on the operator's side of the conveyor of FIG. 2 in the area of the printer 14.

Figure 9:
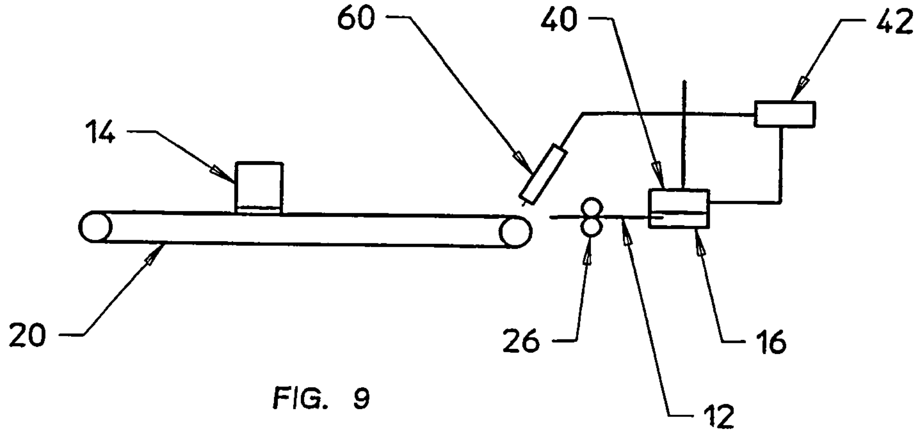
FIG. 9 is a schematic view of a circuit including a sensor for sensing the apertures in the belt and controlling the actuation of the feeder which feeds the sheets to the conveyor belt.

The feeder 16 and the conveyor belt 20 must be in time or synchronized so that sheets 12 can be fed on and carried by the belt at a calculated position relative to the belt apertures 22. In order to arrive at a gap 18 between successive sheets 12, the length or dimension of the sheet 12 (measured in the direction of the conveyor path) and the dimension of the gap (measured in the direction of the conveyor path) must add up to a multiple of the pitch of the belt apertures 22 which are equally spaced from each other in each of the rows of apertures. Knowing the length of the sheet 12, plus the number and pitch of the belt apertures 22 in a row, and the speed of the conveyor belt 20, the computer 42 (FIG. 9) can calculate the distance the sheet will extend beyond the covered apertures 22 at each end of the sheet in order to center the sheet over the apertures 22 that the sheet covers. A photoelectric sensor 60 shown in FIG. 9 counts the apertures 22 as they pass the photoelectric cell and sends it to the computer 42 to activate the feeder 16 after, a certain interval of time which has been calculated, taking into account the known factors described above. The feeder 16 then feeds a sheet to the conveyor 20, and the process is repeated and a sheet 12 is fed to the conveyor 20 at the same intervals of time until the job is completed or otherwise terminated. When a new printing operation is to be run on sheets 12 of a different size, the interval of operation (the time cycle) of feeder 16 can be easily adjusted as taught in U.S. Pat. No. 7,635,124 B2 to suit the different size of the sheets 12. This is a significant advancement in the box-making art since the repeat time or time cycle of operation of conventional feeders is constant regardless of the size of the boards being processed.

Figure 10:
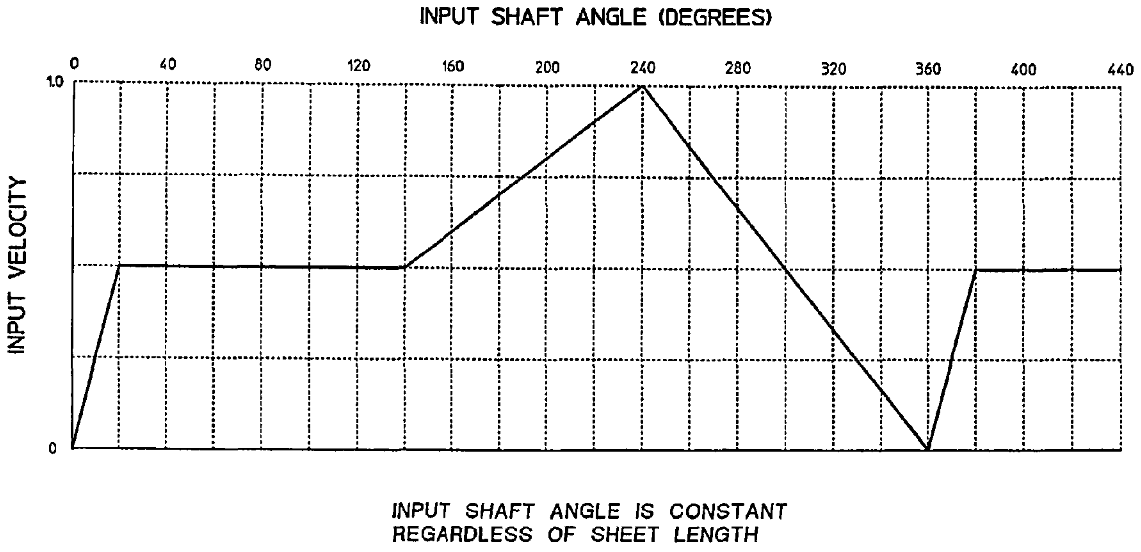
FIG. 10 is a graph of the input shaft position (angle) versus its velocity of a feeder for delivering sheets to a belt conveyor in accordance with a preferred form of the present invention.
Figure 11:
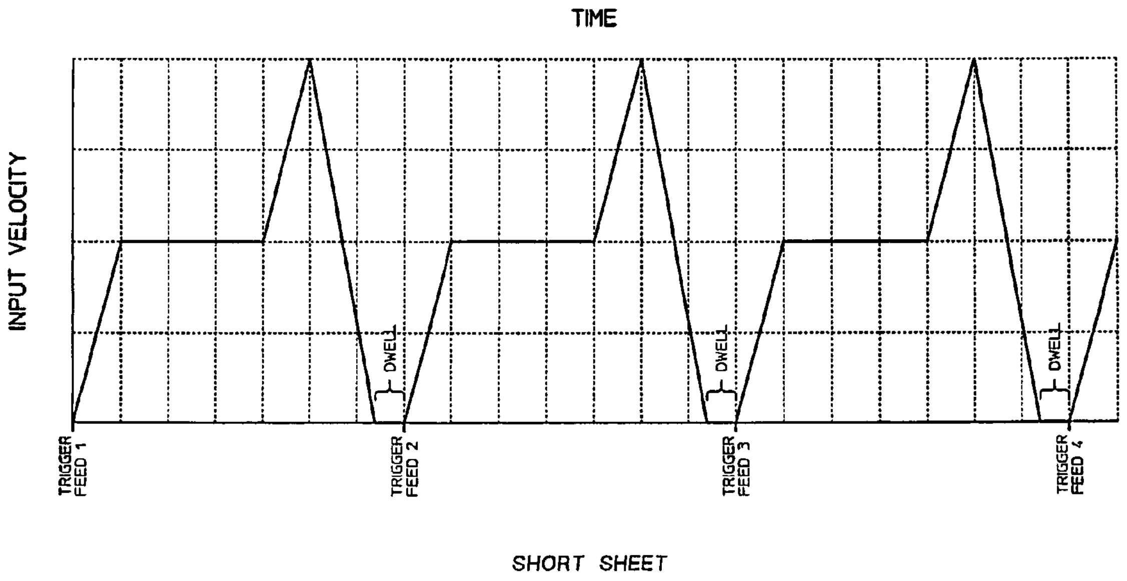
FIG. 11 is a graph similar to FIG. 10 for short sheets being fed.
Figure 12:
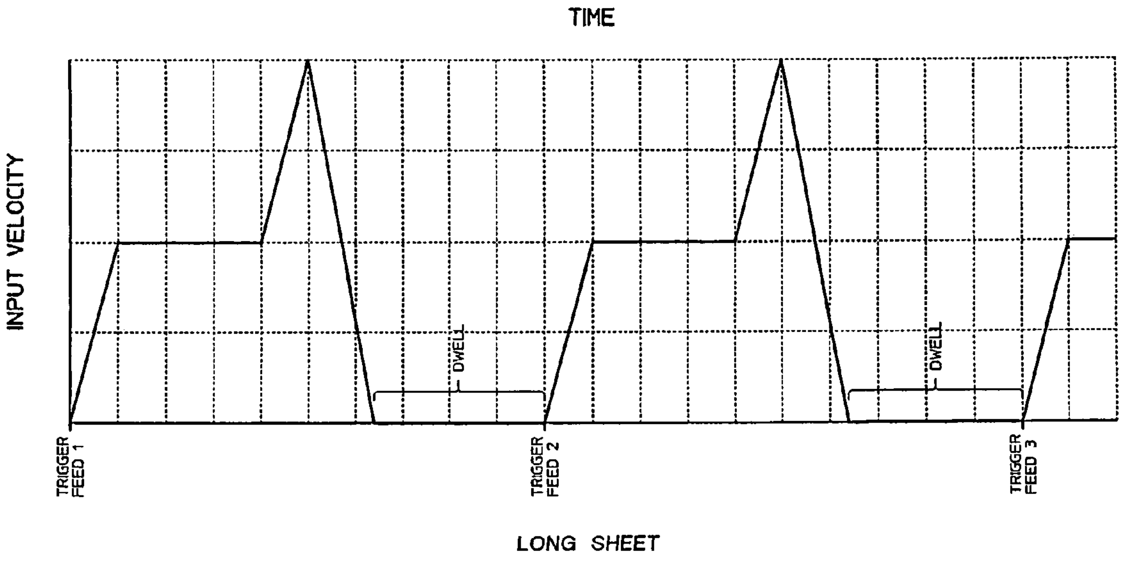
FIG. 12 is a graph similar to those above except it is for long sheets being fed.

In the form of the invention just described above, the initiation of the feed of sheets 12 to conveyor 10 is timed based on the pitch or distance between the holes or apertures 22 in a conveyor belt where the holes are equally spaced from each other in the longitudinal and transverse directions of the belt. However in another and preferred method of the present invention, initiation of the feed is not dependent on a predetermined pitch or spacing between the apertures 22. Rather it is based on the actual position of the apertures 22 during operation and will therefore not be affected if the actual pitch of the apertures is different than the predetermined pitch of the apertures or if the apertures are not equally spaced from each other. In the present method, the feeder 16 is reregistered to the true position of the apertures 22 in the conveyor belt on each and every feed of sheet, and therefore requires that initiation of the feed of each sheet 12 by feeder 16 occur at the same position (angle) of the input shaft of feeder 16 every time. After each sheet feed, the transmission of feeder 16 always returns to its starting position and stops. In this preferred method of the present invention, the input motion profile over the 360° transmission cycle is not a function of sheet size and the input velocity is scaled up or down based on machine speed, as shown in FIG. 10. A dwell is added between each cycle of the feeder 16 to allow for different sheet sizes. FIGS. 11 and 12 show how this dwell changes for short sheets and long sheets. For the shortest sheet that can be fed there is almost no dwell time. In all cases the feeder input shaft returns to a stop after feeding each sheet. A servo motor is used in feeder 16 to achieve this motion profile.

Figure 13:
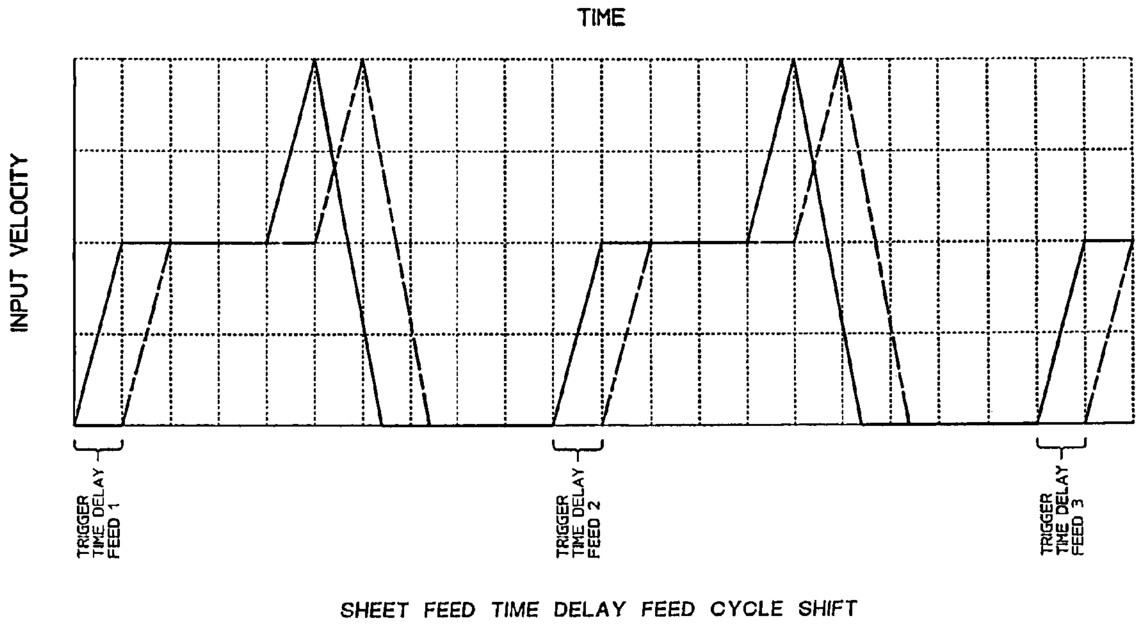
FIG. 13 is a graph similar to those above except it shows a time delay for shifting the position of the sheet relative to the apertures in the conveyor belt.

When the feed cycle is initiated in response to the actual position of holes 22 in the belt, the position of the sheet relative to the holes in the belt is shifted to the desired position through a time delay. FIG. 13 shows how the calculated time delay is used to shift the actual feeding of the sheet relative to the trigger signal from the belt hole sensor 60. This could also be done by using an encoder that is measuring the position of the conveyor belt. Instead of applying a time delay to shift the feed cycle, it could wait a certain number of encoder counts after seeing a hole in the belt to start the feed cycle. Each method provides the same result.

Although the belt conveyor 10 shown and described above includes a single belt 20, it will be understood that it may include two or more belts (not shown) arranged in side by side relationship.

Although preferred forms of the method and apparatus of the present invention have been shown and described above, variations of the present inventions will become apparent to those skilled in the art but without departing from the scope of the invention appearing in the following claims.

I claim:

1. Apparatus for digital printing of planar articles comprising in combination:

a digital printer, a conveyor having a conveyor belt movable along a generally horizontal path for moving planar articles along said path to said printer, said belt having a plurality of apertures for introducing a vacuum to the underside of articles on said belt to hold the articles on the belt, and means for opening a number of said apertures to a source of vacuum and for closing other apertures in the belt to a source of vacuum while said first number of apertures are open to said vacuum source, and means for successively feeding articles on the conveyor belt such that there are gaps between successive articles on the belt and said gaps do not contain any apertures.

2. The apparatus defined in claim 1 wherein said other apertures are positioned on the belt outwardly of but adjacent to an edge of the articles being conveyed by the belt.

3. The apparatus defined in claim 1 including means for positioning articles on the conveyor belt offset to one side of the belt and covering all of said apertures positioned on said one side of the belt to the extent of the dimension of the articles measured along the direction of said horizontal path.

4. Apparatus defined in claim 1 wherein said apertures are in rows extending along said path and are spaced from each other with a pitch such that the dimension of an article measured along said path plus the dimension of a gap between adjacent articles and measured along said path equals a multiple of said pitch.

5. The apparatus defined in claim 4 wherein the apertures in each row are equally spaced from each other.

6. Apparatus defined in claim 1 including a feeder for feeding articles on said belt in a timed manner, a computer for controlling said feeder, and a sensor for sensing the apertures in the belt as the belt is moving along said path and for sending a signal to said computer for feeding articles to the conveyor for printing the articles in a predetermined position relative to said apertures.

7. The apparatus defined in claim 1 wherein said conveyor has a plurality of independent plenums having chambers communicating with said apertures for respectively supplying vacuum to said apertures, and wherein there is further included means for selectively applying a vacuum to said plenums for supplying preselected apertures.

8. The apparatus defined in claim 7 wherein said apertures are arranged in a plurality of rows extending along the belt, and each row of apertures includes apertures respectively in communication with said plenums.

9. Apparatus defined in claim 1 including a sensor for locating the position of said belt apertures as the belt is moving along said path and sending a signal to said feeder for feeding an article with its leading edge on one of said gaps of the belt.

10. The apparatus defined in claim 1 including means for positioning articles on the conveyor belt offset to one side of the belt and covering apertures positioned adjacent the edge of said belt on said one side of the belt to the extent of the dimension of the articles measured along the direction of said horizontal path.

11. A method of printing planar articles with a digital printer positioned along a generally horizontal path of conveyance of the articles including the steps of:

sequentially conveying the articles along the path with a vacuum belt conveyor having apertures in the belt for holding the articles on the belt by a vacuum applied to apertures covered by the articles, the step of excluding the vacuum from apertures in the belt located outwardly of and adjacent the edges of the articles, and further including the step of sequentially depositing the articles on the conveyor belt with gaps between successive articles without belt apertures in the gaps.

12. The method defined in claim 11 including the step of depositing the articles on the conveyor belt offset to one side of the belt and covering all of the apertures on said side throughout the extent of the articles measured in the direction of said path.

13. The method defined in claim 11 including the step of sensing the apertures in the belt as the belt moves along said path, and sending a signal for feeding an article on the conveyor for printing the article.

14. The method defined in claim 13 including the step of counting the apertures as they pass the sensor and sending a signal for feeding the article on the conveyor.

15. The method defined in claim 11 including the step of feeding the articles on said conveyor in a timed manner such that the leading and trailing edges of the article are positioned between apertures in the belt.

16. Apparatus for digital printing of planar articles comprising in combination:

a digital printer, a conveyor having a conveyor belt movable along a generally horizontal path for moving planar articles with a gap between the articles along said path to said printer, said belt having a plurality of apertures for introducing a vacuum to the underside of articles on said belt to hold the articles on the belt, means for opening a number of said apertures to a source of vacuum and for closing other apertures in the belt to a source of vacuum while said first number of apertures are open to said vacuum source, and wherein said apertures are in rows extending along said path and are spaced from each other with a pitch such that the dimension of an article measured along said path plus the dimension of said gap between adjacent articles and measured along said path equals a multiple of said pitch.

17. Apparatus for digital printing of planar articles comprising in combination:

a digital printer, a conveyor having a conveyor belt movable along a generally horizontal path for moving planar articles with a gap between the articles along said path to said printer, said belt having a plurality of apertures for introducing a vacuum to the underside of articles on said belt to hold the articles on the belt, means for opening a number of said apertures to a source of vacuum and for closing other apertures in the belt to a source of vacuum while said first number of apertures are open to said vacuum source, and means for depositing the articles on the conveyor belt offset to one side of the belt and covering all the apertures on said side throughout the extent of the articles measured in the direction of said path.

18. Apparatus for digital printing of planar articles comprising in combination:

a digital printer, a conveyor having a conveyor belt movable along a generally horizontal path for moving planar articles with a gap between the articles along said path to said printer, said belt having a plurality of apertures for introducing a vacuum to the underside of articles on said belt to hold the articles on the belt, means for opening a number of said apertures to a source of vacuum and for closing other apertures in the belt to a source of vacuum while said first number of apertures are open to said vacuum source, and means for depositing the articles on the conveyor belt offset to one side of the belt and covering apertures adjacent an edge of said belt on said one side of said belt throughout the extent of the dimension of the articles measured in the direction of said path.

19. Apparatus defined in claim 18 including a sensor for sensing the apertures in the belt as the belt is moving along said path and for sending a signal for feeding articles to the conveyor for printing the articles in a predetermined position relative to said apertures.

20. Apparatus defined in claim 19 wherein said apertures are in rows extending along said path and are spaced from each other with a pitch such that the dimension of an article measured along said path plus the dimension of the gap between adjacent articles and measured along said path equals a multiple of said pitch.

* * * * *